3,485,782
PROCESS FOR EXTRUDING HIGH-IMPACT THERMOPLASTIC ALKENYL AROMATIC POLYMERS CONTAINING STEREOSPECIFIC POLYBUTADIENE
Floyd B. Nagle, Midland, Mich., assignor to The Dow Chemical Company, Midland, Mich., a corporation of Delaware
No Drawing. Filed May 29, 1967, Ser. No. 642,129
Int. Cl. C08f 33/08
U.S. Cl. 260—27                    6 Claims

ABSTRACT OF THE DISCLOSURE

Compositions comprising a thermoplastic alkenyl aromatic polymer consisting essentially of particles of a normally solid graft copolymer of from 90 to 98 percent by weight of a monoalkenyl aromatic hydrocarbon and from 10 to 2 percent by weight of a stereospecific 1,4-polybutadiene rubber having at least 25 percent cis-1,4-polymer, having coated on the surfaces of said copolymer particles from 0.5 to 5 percent by weight of powdered rosin od a rosin derivative.

---

This invention relates to the production of plastic articles from thermoplastic high-impact alkenyl aromatic polymers containing stereospecific polybutadiene rubber by extrusion methods and pertains especially to a method of improving the rate of extrusion of such materials to produce shaped articles of uniform dimensions. The invention also relates to the compositions.

In fabricating high-impact thermoplastic alkenyl aromatic polymers, e.g., copolymers of styrene with a stereospecific polybutadiene rubber, by extrusion methods it has been observed that there is a tendency of the material to surge in the extruder, and when the rate of extrusion is increased beyond a given rate for a particular apparatus, that the extruded article is non-uniform, usually has a rough or pebbled surface and may contain bubbles which appear to be caused by the entrapping of air or vapors of volatile materials in the extruded material. These difficulties cannot readily be overcome by lowering the rate of extrusion, and even if they were, such procedure is disadvantageous because it adds to the cost of the extruded article.

It has now been discovered that the rate of extrusion of high-impact thermoplastic alkenyl aromatic polymers containing stereospecific polybutadiene rubber, e.g., copolymers of monovinyl aromatic hydrocarbons of the benzene series such as styrene or vinyltoluene and from 2 to 10 percent of a stereospecific polybutadine rubber chemically combined in the copolymer, can readily be increased and the extrusion carried out without surging of the material in the plastics extruder or of the extrudate to produce extruded articles such as a sheet, bar, rod, strip, or other shaped articles, by mixing with the high-impact alkenyl aromatic polymer, suitably in granular form, a finely divided rosin or a rosin derivative such as a thermoplastic acidic refined wood rosin, or a modified rosin, such as a dimerized or hydrogenated rosin or a limed rosin, having a softening point of at least 40° C., preferably from 40° to 200° C., and an acid number of at least 40 or above, preferably from 40 to 190, and in an amount corresponding to from 0.05 to 5, preferably from 0.1 to 3 percent by weight of the high-impact alkenyl aromatic polymer and thereafter extruding the mixture of said materials.

It has further been found that it is advantageous to adhere the finely divided or powdered rosin to surfaces of the granular high-impact alkenyl aromatic polymer, since adhering the powdered rosin to the granules provides more uniform distribution of the same throughout a body of the granular polymer and avoids the occurrence of dusting.

The powdered or finely divided rosin can be adhered to the high-impact alkenyl aromatic polymer granules in usual ways such as by blending the granular high-impact polymer with the desired amount of the finely divided rosin in a tumbler until the powder is uniformly distributed throughout the body, or over the surfaces, of the granules and thereafter adding a small amount of from 0.01 to 5 percent, of a liquid which swells or softens the resin such as petroleum ether boiling between about 30° and 210° C., or a small amount of a liquid such as petroleum ether mixed with a similarly small proportion of a liquid polymer of a monoalkenyl aromatic hydrocarbon such as a liquid polystyrene or a liquid poly-alpha-methyl styrene, after which the resulting mixture is blended, then heated suitably in an air oven, or in vacuum to temperatures between about 50° and 75° C. to remove the residual solvent. The granular high-impact alkenyl aromatic polymers having the finely divided rosin adhered to the surfaces as a non-dusting granular material, are a preferred embodiment of the invention.

The high-impact thermoplastic alkenyl aromatic polymer can be a copolymer of one or more monovinyl aromatic hydrocarbons of the benzene series such as styrene, vinyltoluene, vinylxylene, ethylbinylbenzene, isopropyl styrene, tert.-butylstyrene and the like and a stereospecific 1,4-polybutadiene rubber having at least 25 percent of cis-1,4 polymer, which alkenyl aromatic polymer contains from 90 to 98 percent by weight of the monovinyl aromatic hydrocarbon in chemically combined form, or interpolymerized, with from 10 to 2 percent by weight of the stereospecific 1,4-polybutadiene rubber.

The high-impact alkenyl aromatic polymers can be prepared in usual ways, e.g., by dissolving or dispersing the stereospecific polybutadiene rubber in the monomeric monovinyl aromatic hydrocarbon to form a solution or a homogeneous dispersion and heating the solution in mass to polymerize the monomers.

The rosin is used in the form of a fine powder, i.e., in the form of particles of sizes not greater than 20, preferably in particles of sizes not greater than about 50 to 100 mesh per inch and as fine as 300 mesh or smaller as determined by U.S. Standard screens, and is employed as a dusting powder, i.e., it is blended with solid granules or particles of the high-impact alkenyl aromatic polymer so as to coat the surfaces of the granules.

The powdered rosin adheres to surfaces of the granules of the high-impact alkenyl aromatic polymer and has an action in the extruder of creating friction or "bite" between surfaces of the screw, the barrel and the polymer, thus facilitating extrusion of the heat-softened material, and of inhibiting or preventing surging of the polymer material in the extruder so that the extrusion can be carried out at substantially faster rates to obtain plastic articles which are free from imperfections and are of uniform shape.

In practice, a high-impact thermoplastic alkenyl aromatic polymer such as a copolymer of about 95 percent by weight of styrene and about 5 percent of a stereospecific polybutadiene rubber having at least 25 percent 1,4 polymer or configuration, in the form of molding granules of sizes between say about 8 to 50 mesh per inch as determined by U.S. Standard screens, is dry-blended with from 0.05 to 5 percent by weight of rosin or a rosin derivative as hereinbefore defined and in the form of a fine powder, suitably a powder consisting of particles not greater than 20, preferably between 50 and 300, or smaller mesh per inch. The mixture of the materials is fed to a plastics extruder wherein it is heat softened and mechanically worked at temperatures between about 135° and 280° C. and is discharged through an orifice at temperatures between about 180° and 280° C. The invention is advantageously employed in extruding high-impact thermoplastic alkenyl aromatic polymers containing from about 2 to 10 percent by weight of a stereospecific polybutadiene rubber in the form of sheet for making plastic articles, e.g., by vacuum forming, having a high impact strength.

The following examples illustrate ways in which the principle of the invention has been applied, but are not to be construed as limiting its scope.

EXAMPLE 1

In each of two experiments, a copolymer of 94.5 percent by weight of styrene and 5.5 percent by weight of stereospecific 1,4-polybutadiene having a Mooney number ML1+4 (212F) of 35 and consisting of about 32 percent cis-1,4 about 61 percent trans-1,4 and less than 10 percent 1,2 polymer was fed to the barrel of a 4.5 inch diameter screw-type plastics extruder in the form of solid discrete free-flowing particles. The material was heat-softened in the plastics extruder in zones maintained at about 212° C., 230° C., and 265° C. as it progressed through the extruder under pressure of the forwarding screw and was discharged through a slotted die at a temperature of about 250° C. in the form of a continuous sheet 1/16 inch thick. In carrying out the experiment the forwarding screw was rotated at a constant rate of 124 revolutions per minute. The extruded sheet was observed for imperfections, and the rate of production per hour determined at the constant screw speed. In experiment A the feed material was the granular copolymer of 94.8 percent styrene and 5.5 percent stereospecific polybutadiene rubber. In experiment B the feed material was the granular copolymer of 94.5 percent styrene and 5.5 percent stereospecific polybutadiene rubber, which copolymer granules were intimately dry-blended with 0.5 percent by weight of powdered "Dimerex," a hard, thermoplastic dimerized rosin acid having a softening point of 152° C. and an acid number of 135, by mixing the granules of the copolymer and the powdered rosin in a tumber mixer. In experiment A without the dimerized rosin acids the rate of extrusion was 262 pounds per hour. In experiment B with the dimerized rosin acids the rate of extrusion was 523 pounds per hour.

EXAMPLE 2

A batch of a granular high impact copolymer of 94.5 percent by weight of styrene and 5.5 percent of stereospecific polybutadiene which granules were coated or dusted with 1% by weight of limed "Poly-pale" resin, a rosin having a softening point of 197° C. and an acid number of 42. The coated polymer granules were fed to a 1.25 inch diameter worm plastics extruder wherein the polymer was pressed, was heated and was extruded as a molten strand that was cooled and cut to a granular form. The rosin coated polymer granules extruded at a rate of 12.1 pounds per hour.

In contrast, the uncoated polymer granules extruded at a rate of only 9.85 pounds per hour.

Similar improvements in the rate of extrusion of styrene polymers toughened with from 2 to 10 percent by weight of 1,4 stereospecific polybutadiene rubbers having at least 25 percent cis-1,4 polymer when the polymer granules are coated or dusted with other rosin acids or modified rosin acids such as wood rosin (acidic refined natural resins), "Poly-pale" (40% dimeric resin acids, having a softening point of 102° C. and an acid number of 145), or "Stabellite" (hydrogenated rosin, having a softening point of 75° C. and an acid number of 165), which rosin or modified rosin has a softening point of at least 40° C. and an acid number of 40 or greater.

I claim:

1. In a process for making a shaped plastic article wherein a thermoplastic alkenyl aromatic polymer consisting essentially of a normally solid resinous graft copolymer of from 90 to 98 percent by weight of a monovinyl aromatic hydrocarbon of the benzene series and from 10 to 2 percent of a stereospecific 1,4-polybutadiene rubber having at least 25 percent cis-1,4 polymer, is fed to an extruder in the form of discrete particles of sizes not greater than about 8 mesh per inch as determined by U.S. Standard series, wherein the polymer is heat-plastified at temperatures between 135° and 280° C. under pressure and is extruded in the form of a body having a predetermined shape at temperatures between 180° and 280° C., the improvement which consists in blending with the feed of said thermoplastic alkenyl aromatic polymer particles so as to coat the surface thereof, from 0.05 to 5 percent by weight of a powdered rosin or a modified rosin having a softening point of at least 40° C. and an acid number of at least 40, said rosin being in the form of finely divided particles of sizes not greater than 20 mesh per inch as determined by U.S. Standard screen.

2. A method as claimed in claim 1, wherein the thermoplastic alkenyl aromatic polymer is a graft copolymer of from 90 to 98 percent by weight of styrene and from 10 to 2 percent of a stereospecific polybutadiene rubber having at least 90 percent cis-1,4-configuration.

3. A method of making sheet material which comprises feeding a normally solid resinous graft copolymer of from 90 to 98 percent by weight of styrene and from 10 to 2 percent of a stereospecific polybutadiene having from 30–35 percent cis-1,4, from 60–65 trans-1,4 and not more than 10 percent 1,2-polymer, in the form of discrete particles, and having adhered to surfaces of said particles from 0.05 to 5 percent by weight of a rosin or a modified rosin having a softening point of at least 40° C. and an acid number of at least 40, to a plastics extruder wherein the materials are heat-plastified at temperatures between 135° and 280° C. under pressure and extruding the resulting plastic mass at temperatures between 180° and 280° C., in the form of a continuous sheet.

4. A composition of matter comprising a thermoplastic alkenyl aromatic resin consisting essentially of particles of a normally solid resinous graft copolymer of from 90 to 98 percent by weight of a monovinyl aromatic hydrocarbon of the benzene series and from 10 to 2 percent of a stereospecific 1,4-polybutadiene rubber having at least 25 percent cis-1,4 polymer having coated on the surface of said graft copolymers particles from 0.05 to 1 percent by weight of a powdered rosin or a modified rosin having a softening point of at least 40° C. and an acid number of at least 40 and in the form of finely divided particles of sizes not greater than 20 mesh per inch as determined by U.S. Standard screen.

5. A composition as claimed in claim 4, wherein the thermoplastic alkenyl aromatic resin is a graft copolymer of from 90 to 98 percent by weight of styrene and from 10 to 2 percent of a stereospecific polybutadiene rubber having at least 90 percent cis-1,4 configuration.

6. A composition as claimed in claim 4, wherein the thermoplastic alkenyl aromatic resin is a graft copolymer of from 90 to 98 percent by weight of styrene and from 10 to 2 percent of a stereospecific polybutadiene having from 30–35 percent cis-1,4- from 60–65 percent trans-1,4 and not more than 10 percent 1,2-polymer.

References Cited

UNITED STATES PATENTS

| | | | |
|---|---|---|---|
| 2,384,683 | 9/1945 | Kistler | 260—27 |
| 2,755,270 | 7/1956 | Hayes | 260—880 |
| 3,358,060 | 12/1967 | Ohsol | 264—176 |
| 3,280,876 | 10/1966 | Snow | 260—27 |

FOREIGN PATENTS 227,761   5/1959   Australia.

OTHER REFERENCES

Binder, J. L.: "Analytical Chemistry," December 1954, vol. 27, No. 26 (pp. 1877 to 1882 relied on).

DONALD E. CZAJA, Primary Examiner

W. E. PARKER, Assistant Examiner

U.S. Cl. X.R.

264—176; 260—880; 117—100